United States Patent Office

3,715,249
Patented Feb. 6, 1973

3,715,249

ETCHING $Si_3N_4$

Peter Theodore Panousis, New Providence, N.J., and Herbert Atkin Waggener, Allentown, Pa., assignors to Bell Telephone Laboratories, Incorporated, Murray Hill, N.J.

No Drawing. Filed Sept. 3, 1971, Ser. No. 177,840
Int. Cl. H01l *7/50*
U.S. Cl. 156—17 3 Claims

ABSTRACT OF THE DISCLOSURE

The specification describes a process for etching silicon nitride in the presence of silicon. It has been found that silicon, especially when highly doped, is attacked by the normal phosphoric acid etchant for $Si_3N_4$. The addition of $H_2SO_4$ to the phosphoric acid prevents the attack of silicon.

This invention relates to etching processes for silicon nitride.

BACKGROUND OF THE INVENTION

The commonly used etchant for silicon nitride, phosphoric acid, also attacks silicon. This is a problem in planar silicon processing when a silicon nitride etch step is made after windows to the bare silicon have been formed. It is also a problem in silicon gate technology where the metallization is part or all silicon. See, for example, U.S. Pat. No. 3,475,234 (particularly, step 9).

It would therefore be desirable to have an etchant for silicon nitride that is as effective as the conventional hot phosphoric acid etch but which does not appreciably attack silicon.

SUMMARY OF THE INVENTION

This invention is directed to such an etchant which comprises a mixture of phosphoric acid and sulfuric acid. The latter ingredient has been found to passivate the etching action of the phosphoric acid with respect to silicon while, within certain compositional limits, leaving the etching efficiency of the silicon nitride essentially unaffected.

In order to demonstrate the etching behavior of the etchant of the invention as compared with that conventionally used, a series of silicon and silicon nitride samples were exposed to various etch compositions. The results are summarized in the following table.

TABLE 1

| | $Si_3N_4$ etch rate (a./min.) | 1 hr. etch of emitter contact windows |
|---|---|---|
| 85% $H_3PO_4$: | | |
| 180° C | 110 | Heavy etching. |
| 170° C | 80 | Moderate etching. |
| 75% $H_3PO_4$, 10% $H_2SO_4$: | | |
| 180° C | 110 | Very light etching. |
| 170° C | 80 | No etching. |
| 68% $H_3PO_4$, 20% $H_2SO_4$: | | |
| 180° C | 110 | Do. |
| 170° C | 80 | Do. |
| 50% $H_3PO_4$, 40% $H_2SO_4$: | | |
| 180° C | 95 | Do. |
| 170° C | 67 | Do. |

All percentages are by volume with $H_2O$ to 100% and with additional water added to bring the solution to a boiling point at the temperature indicated. The boiling solution was used in each case for the etching process.

The data shows that the effect of the sulfuric acid additive on the etching behavior of silicon nitride is negligible except at the highest concentration where a modest inhibiting effect starts to become apparent. This result is useful for establishing a maximum concentration beyond which the etch rate of the nitride will be significantly impaired. The amount of diluent water is incidental except as it affects the boiling point of the composition. The water concentration is normally fixed by reflux to give a desired boiling point, typically 180° C. However, the precise amount is a matter of choice. It would be unlikely that this etch would find applications of the nature contemplated herein if the water content appreciably exceeded 30% (by volume).

The data also suggests that at lower temperatures the problem of silicon etching becomes less severe, and indeed this has been found to be so. However, this study has also revealed that the sensitivity of the silicon to the etchant is dependent to some extent on the impurity concentration. Very heavily doped silicon, such as that used characteristically on transistor emitter contact windows, or in source and drain contact windows for FET's, is especially susceptible to phosphoric acid etching. The data of Table 1 was obtained with 0.001 ohm cm. n-type silicon. The n-type material is somewhat more susceptible than p-type material with a corresponding impurity level. The important conclusion from this aspect of the study is that under favorable circumstances, i.e., relatively high conductivity material (i.e., >1 ohm cm.) and low temperature etch, the conventional procedure is adequate. Specifically, at the expense of approximately one-half of the silicon nitride etch rate, a phosphoric acid etch at 160° C. is marginally adequate even for moderately doped silicon. However, if the doping is heavy or a faster nitride etch rate is desired, the sulfuric acid additive of the invention will be useful. Since the additive is in no way detrimental, it would appear to be useful as a universal etch under the broad conditions discussed above. However, for the purpose of defining the conditions under which the etch is most advantageous, an etch temperature of at least 160° C. and an etchant containing approximately 10%–40% $H_2SO_4$ is recommended.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A process for etching silicon nitride in the presence of doped silicon without significantly attacking the silicon comprising the step of contacting the silicon nitride with a boiling solution of $H_3PO_4$ with approximately 10% to 40% by volume of $H_2SO_4$ and sufficient water to establish a boiling point in the range of 160° C. to 180° C.

2. The process of claim 1 in which the silicon has a resistivity of the order of 0.001 ohm cm.

3. The process of claim 2 in which the solution contains 10% $H_2SO_4$ and has a boiling point of approximately 160° C.

References Cited

UNITED STATES PATENTS 3,607,480 9/1971 Harap et al. ---------- 156—17

JACOB H. STEINBERG, Primary Examiner

U.S. Cl. X.R.

148—187; 252—79.2